US007745041B2

(12) United States Patent
Kozuki et al.

(10) Patent No.: US 7,745,041 B2
(45) Date of Patent: Jun. 29, 2010

(54) ELECTROCHEMICAL ELEMENT

(75) Inventors: Kiyomi Kozuki, Moriguchi (JP); Takuya Nakashima, Osaka (JP)

(73) Assignee: Panasonic Corporation, Osaka (JP)

( * ) Notice: Subject to any disclaimer, the term of this patent is extended or adjusted under 35 U.S.C. 154(b) by 1383 days.

(21) Appl. No.: 11/150,095

(22) Filed: Jun. 13, 2005

(65) Prior Publication Data

US 2005/0277021 A1 Dec. 15, 2005

(30) Foreign Application Priority Data

Jun. 14, 2004 (JP) ............................ 2004-175187

(51) Int. Cl.
*H01M 10/00* (2006.01)
*H01M 4/02* (2006.01)
*H01M 4/72* (2006.01)

(52) U.S. Cl. ....................... 429/122; 429/211; 429/233; 429/209

(58) Field of Classification Search .................. 429/211
See application file for complete search history.

(56) References Cited

U.S. PATENT DOCUMENTS

| | | | | |
|---|---|---|---|---|
| 2004/0058244 | A1 * | 3/2004 | Hosoya et al. | 429/231.1 |
| 2004/0061476 | A1 | 4/2004 | Nakamaru et al. | |
| 2004/0096733 | A1 * | 5/2004 | Shibamoto et al. | 429/94 |
| 2005/0058908 | A1 * | 3/2005 | Imachi et al. | 429/233 |

FOREIGN PATENT DOCUMENTS

| | | |
|---|---|---|
| CN | 2598160 | 1/2004 |
| JP | 9-180761 | 7/1997 |
| JP | 10-050556 | 2/1998 |
| JP | 11-135101 | 5/1999 |
| JP | 2000-040501 | 2/2000 |
| JP | 2000-294222 | 10/2000 |

OTHER PUBLICATIONS

English machine translation of JP 11-135101.*
English language Abstract of JP 11-135101.
English language Abstract of JP 9-180761.
English language Abstract of CN 2598160.
English Language Abstract of JP 2000-294222.
English Language Abstract of JP 2000-040501.
English Language Abstract of JP 10-050556.
U.S. Appl. No. 11/150,123 to Kozuki, filed Jun. 2, 2005.

* cited by examiner

*Primary Examiner*—Dah-Wei D Yuan
*Assistant Examiner*—Maria J Laios
(74) *Attorney, Agent, or Firm*—Greenblum & Bernstein, P.L.C.

(57) ABSTRACT

Positive and negative electrodes include exposed current collector portions at both lengthwise ends, and these exposed current collector portions are bent such as to protrude from the widthwise edge of the electrodes to form welding pieces. The positive and negative electrodes and a separator interposed therebetween are wound around into a flat shape having an ellipsoidal cross section. The welding pieces of the positive and negative electrodes protruding from opposite sides of the wound electrodes are welded together with respective leads. According to this configuration, a simple but high-quality current collector design capable of stable electrical connection in a high power output prismatic electrochemical element is provided.

11 Claims, 8 Drawing Sheets

F i g . 5 A
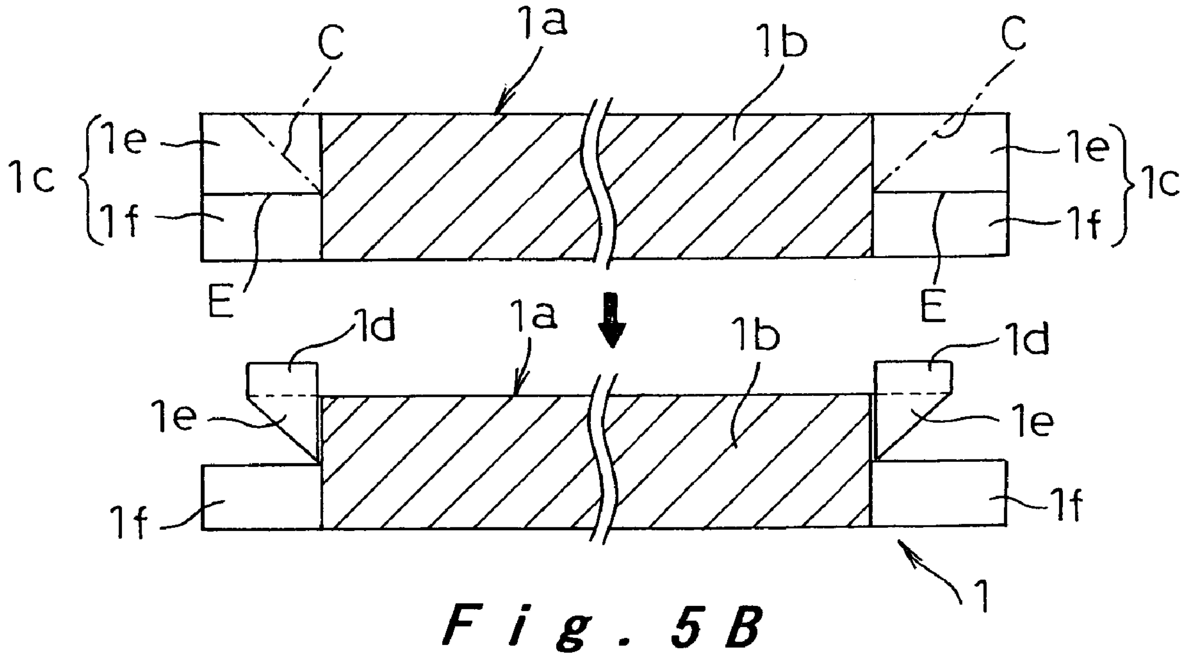
F i g . 5 B
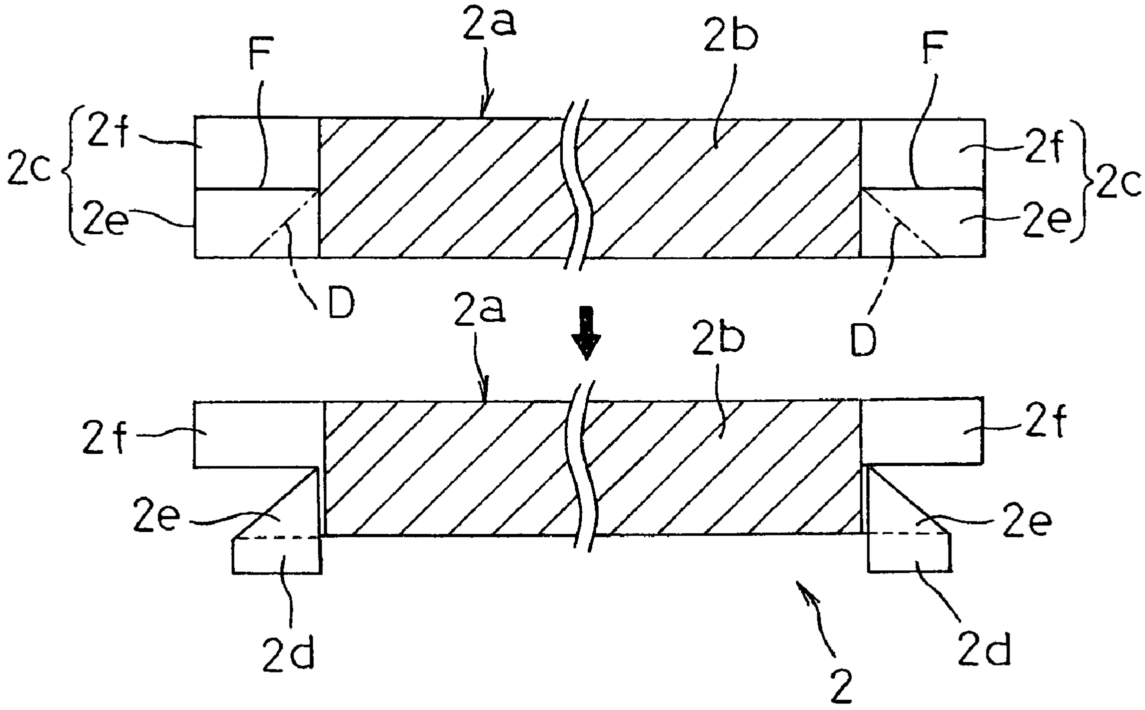

ELECTROCHEMICAL ELEMENT

The present disclosure relates to subject matter contained in priority Japanese Patent Application No. 2004-175187 filled on Jun. 14, 2004, the contents of which is herein expressly incorporated by reference in its entirety.

BACKGROUND OF THE INVENTION

1. Field of the Invention

The present invention relates to an electrochemical element such as a battery or an electric double layer capacitor having a prismatic outer shape and comprising an electrode assembly composed of positive and negative electrodes wound into a flat shape, and being accommodated into a case together with an electrolyte. In particular the invention relates to an electrochemical element having a current collection structure designed for high power output.

2. Description of the Related Art

In an electrochemical element such as a battery or an electric double layer capacitor, an electrode assembly having a winding structure composed of positive and negative electrodes wound with a separator interposed therebetween is widely employed in order to increase a reaction area per unit volume. The electrode assembly is accommodated in a metal case with an electrolyte, and the case is sealed. An electrochemical element is configured through connecting the positive and negative electrodes to portions serving as positive and external negative connection terminals, respectively, for allowing an external connection.

The positive and negative electrodes are formed by coating an active material to a current collector made of a foil or a thin metal mesh plate, and thus a current path is created through connecting the positive and negative current collectors to portions serving as positive and external negative connection terminals, respectively, by leads. In this case, when only one portion of the current collector is connected to the portion serving as an external connection terminal, a current path from a distant portion in the wound strip-shaped current collector to the connected portion becomes longer, resulting in an increase in electrical loss and temperature rise during a high-rate charge/discharge. Particularly, in the case of an electric double layer capacitor in which energy can be charged/discharged in a short period of time, to advantageously utilize this property, the internal resistance of a current path should be reduced as much as possible.

In order to solve the above problems in the connection between an electrode assembly and external connecting portions for positive and negative electrodes, a battery structure has been developed for improving current collection efficiency (see Japanese Patent Laid-Open Publication No. 2000-294222). In this case, an electrode assembly is formed into a cylindrical shape through winding positive and negative electrodes with a separator interposed therebetween such that part of a current collector of the positive or negative electrode is protruded from one end of the electrode assembly. The current collector protruded from the end is bent inward by pressing the protruded collector in a direction of cylinder axis to form flat regions, and a current collecting plate is welded to the flat regions.

Another battery structure which is suitable for assembling a high power battery pack for an electric vehicle or the like has been developed (see Japanese Patent Laid-Open Publication No. 2000-040501). In this structure, strip-shaped positive and negative electrodes each having a current collector exposed from an edge in the width direction of the strip are wound around a flat winding core to which metal plates serving as positive and negative terminals are attached. The positive and negative terminals are welded to the exposed current collector portions of the positive and negative electrodes, respectively, to form a flat wound electrode, and the end of the each of the positive and negative terminals is extended from a battery case.

Besides the above two examples for a battery, a configuration for an electrical double layer capacitor formed through winding positive and negative electrodes has been developed (see Japanese Patent Laid-Open Publication No. Hei 10-050556). In this case, an electrode assembly is formed such that a plurality of current collecting leads are projected from the current collectors of the wound positive and negative electrodes along a line in a radial direction. The plurality of current collecting leads arranged in the radial direction are bundled, and the bundled portion is clamped with a terminal member made of the same material as the current collecting lead. The clamped portion is then welded to form an output terminal.

However, in the configuration disclosed in Japanese Patent Laid-Open Publication No. 2000-294222 in which a flat surface is formed through bending a current collector protruded from an end and welded with a current collector plate placed thereon, the welding conditions cannot be stabilized when a thin electrode current collector is employed for obtaining high capacity, resulting in a frequent short circuit due to heat fusion of a separator having a poor heat resistance. Particularly, this phenomenon often occurs in a lithium ion battery employing a thin metal foil serving as a current collector, resulting in the reduction in production yield.

The configuration disclosed in Japanese Patent Laid-Open Publication No. 2000-040501 in which positive and negative electrodes are wound around a winding core into a flat shape can be advantageously applied to an apparatus having a relatively large installation space such as an electric vehicle. However, since the winding core is required, the thickness of the battery cannot be reduced as a flat prismatic battery. Therefore, the battery has a disadvantage when the battery is employed in an apparatus requiring downsizing or a plurality of the batteries are integrated to form a battery pack.

In addition, in the configuration disclosed in Japanese Patent Laid-Open Publication No. Hei 10-050556 in which a plurality of current collecting tabs are formed in the radial direction of cylindrically wound positive and negative electrodes, the plurality of current collecting tabs are protruded from the electrodes which are cut into a strip shape. Therefore, the electrodes cannot be cut in an efficient manner, resulting in poor productivity.

SUMMARY OF THE INVENTION

The present invention has been made in view of the above problems in the conventional techniques. It is an object of the present invention to provide an electrochemical element comprising a connection structure which improves the current collection efficiency from an electrode assembly.

An electrochemical element according to a first aspect of the invention comprises a case, an electrolyte, and an electrode assembly accommodated in the case with the electrolyte. The electrode assembly includes a positive electrode including a strip of current collector and a positive electrode active material deposited on the current collector, and a negative electrode including a strip of current collector and a negative electrode active material deposited on the current collector, these electrodes being wound around with a separator interposed therebetween to form the electrode assembly. Positive and negative leads respectively connected to the positive and negative electrodes are connected to portions that serve as respective positive and negative external connection terminals, respectively. In this configuration, the positive and negative electrodes include exposed current collector portions at both ends in a lengthwise direction where the active materials have not been deposited. The exposed current collector portions are bent from a lengthwise direction along a bending line of a predetermined angle, the bending direction of one electrode being opposite from that of the other electrode, such that both edges of the exposed current collector portions in the lengthwise direction protrude beyond the edge of the electrodes in the width direction to form welding pieces. The positive and negative electrodes with the separator interposed therebetween are wound around to form the electrode assembly having an ellipsoidal cross-section, such that the welding pieces are located in a linear portion of the ellipsoidal shape. The welding piece of the positive electrode protruding out from one end of the electrode assembly is pressed together in the shorter side direction of the ellipsoidal cross-section and is welded together with the positive lead to form a welding joint, and the welding piece of the negative electrode protruding out from the other end of the electrode assembly is pressed together in the shorter side direction of the ellipsoidal cross-section and is welded together with the negative lead to form a welding joint.

According to the above configuration, the strip-shaped positive and negative electrodes are wound around to form the flat electrode assembly. The exposed current collector portions of the positive and negative electrodes protruding beyond the separator on respective ends of the electrode assembly are pressed together and welded. Therefore, the positive and negative electrodes are connected to the positive and negative leads, respectively, at a plurality of locations. As current is collected from a plurality of locations of the strips of the positive and negative electrodes, an electrochemical element has a reduced internal resistance and improved current collection efficiency. Thus, energy loss and a temperature rise during high-rate charge and discharge are suppressed.

An electrochemical element according to a second aspect of the invention comprises a case, an electrolyte, and an electrode assembly accommodated in the case with the electrolyte. The electrode assembly includes a positive electrode including a strip of current collector and a positive electrode active material deposited on the current collector, and a negative electrode including a strip of current collector and a negative electrode active material deposited on the current collector, the positive and negative electrodes being wound around with a separator interposed therebetween to form the electrode assembly. Positive and negative leads respectively connected to the positive and negative electrodes are connected to portions that serve as respective positive and negative external connection terminals, respectively. In this configuration, the positive and negative electrodes include exposed current collector portions at both ends in a lengthwise direction where the active materials have not been deposited. One of the exposed current collector portions is connected to a lead welding piece such that one end of the lead welding piece protrudes in a width direction towards a side opposite to the other corresponding electrode. The other of the exposed current collector portions is bent from the lengthwise direction along a bending line of a predetermined angle, the bending direction of one electrode being opposite from that of the other electrode, such that both edges of the exposed current collector portion in the lengthwise direction protrude beyond the edges of the electrode in the width direction to form welding pieces. The positive and negative electrodes with the separator interposed therebetween are wound around to form the electrode assembly having an ellipsoidal cross-section, such that the lead welding piece and the welding pieces are located in a linear portion of the ellipsoidal shape. The lead welding piece and the welding piece of the positive electrode protruding out from one end of the electrode assembly are pressed together in the shorter side direction of the ellipsoidal cross-section and are welded together with the positive lead to form a welding joint, and the lead welding piece and the welding piece of the negative electrode protruding out from the other end of the electrode assembly are pressed together in the shorter side direction of the ellipsoidal cross-section and are welded together with the negative lead to form a welding joint.

According to the above configuration, the strip-shaped positive and negative electrodes are wound around to form the flat electrode assembly. The lead welding piece and the welding piece of the positive electrode protruding beyond the separator on one end of the electrode assembly are pressed together and welded. The lead welding piece and the welding piece of the negative electrode protruding beyond the separator on the other end of the electrode assembly are pressed together and welded. Therefore, the positive and negative electrodes are connected to the positive and negative leads, respectively, at a plurality of locations. As current is collected from a plurality of locations of the strips of the positive and negative electrodes, an electrochemical element has a reduced internal resistance and improved current collection efficiency. Thus, energy loss and a temperature rise during high-rate charge and discharge are suppressed.

In any of the above configurations, the exposed current collector portions at the ends of the positive and negative electrodes are formed in a rectangular shape having a sufficient length so that they protrude a predetermined distance from the edges of the electrode assembly. Thereby, when the rectangular portions are bent along a diagonal line, their end edges protrude beyond the widthwise edges of the electrodes to form the welding pieces. The protruding amount of the welding pieces may be suitably set by adjusting the length of the rectangular portions.

The exposed current collector portions at the ends of the positive and negative electrodes may be split in the widthwise direction such that the split portions are rectangles having a predetermined ratio of long and short sides to ensure that they protrude from the edge of the electrode assembly by a predetermined distance. This way, the area of the exposed current collector portions that does not contribute to power generation is reduced, and the welding pieces are formed without making the electrodes unnecessarily long.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 5A and FIG. 5B are plan views showing the configuration of a positive electrode and a negative electrode, respectively, according to a second embodiment;

DETAILED DESCRIPTION OF THE PREFERRED EMBODIMENTS

Figure 1:
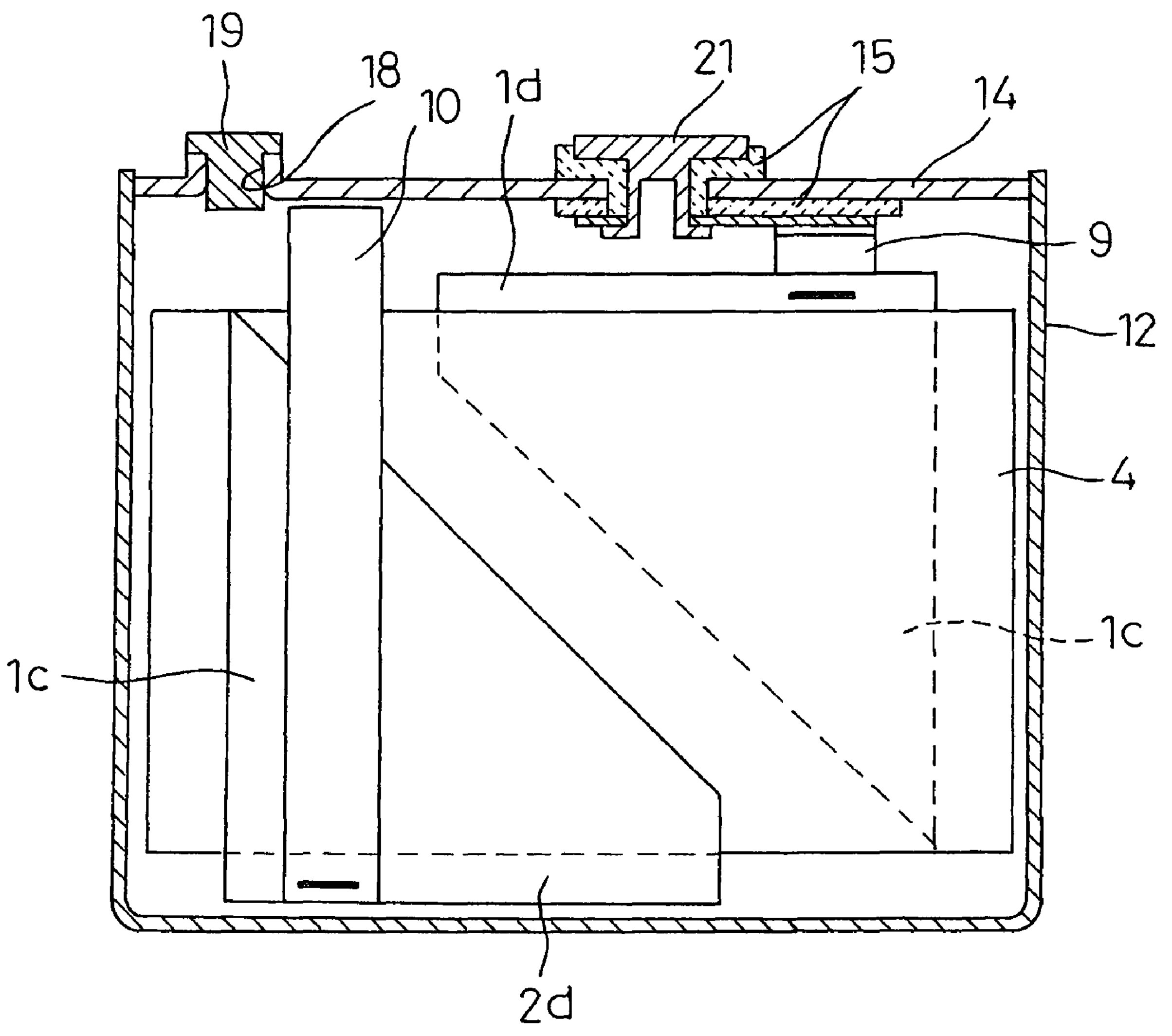
FIG. 1 is a cross-sectional view showing the configuration of a lithium ion rechargeable battery according to one embodiment.

In the present embodiment described below, the connection structure of the present invention is applied to a lithium ion rechargeable battery, which is one example of an electrochemical element. The lithium ion rechargeable battery is formed in a flat prismatic shape as shown in FIG. 1, comprising an electrode assembly 4 encased in a battery case 12. The assembly 4 is composed of a positive electrode, a negative electrode, and a separator interposed therebetween, wound around into a shape having an ellipsoidal cross section. A positive lead 9 extending from the positive electrode is connected to an external positive connection terminal 21 provided in a sealing plate 14, which is for closing the opening of the battery case 12, and is insulated from the external positive connection terminal. A negative lead 10 extending from the negative electrode is connected to the sealing plate 14. The lithium ion rechargeable battery has an electrode structure that reduces the internal resistance so as to be capable of high-rate discharge. First through fourth embodiments of this electrode structure for reducing an internal resistance will be described below.

Figure 2A:
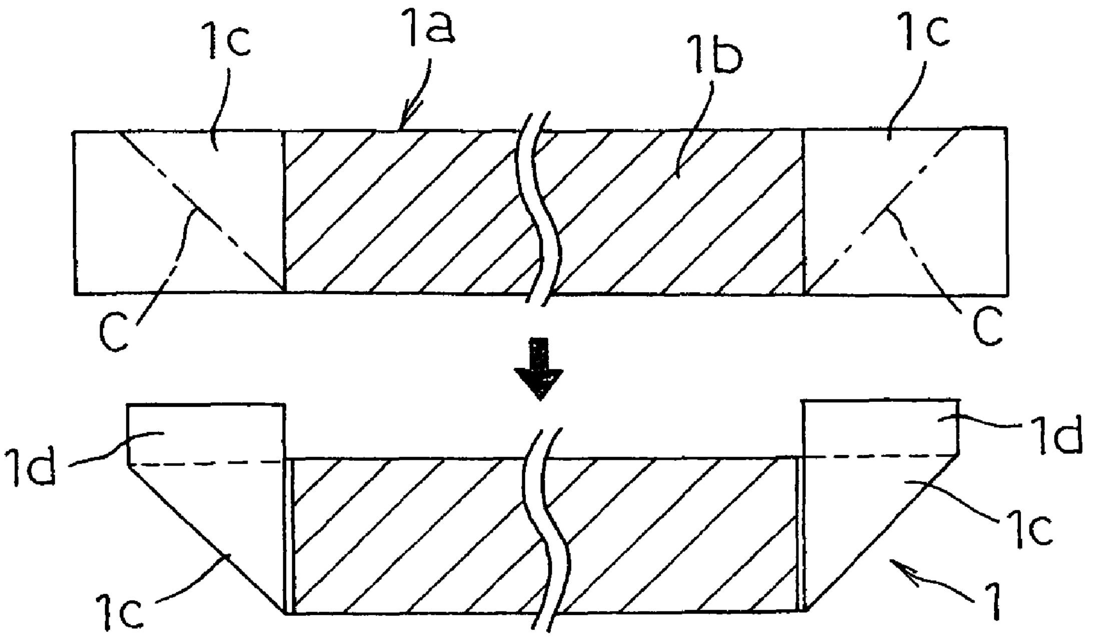
FIG. 2A and FIG. 2B are plan views showing the configuration of a positive electrode and a negative electrode, respectively, according to the first embodiment.

In a first embodiment of the electrode assembly 4, the positive electrode 1 is composed of a positive current collector 1*a* in the form of a strip having a predetermined length and a width, as shown in FIG. 2A, and a positive electrode active material 1*b* deposited on both sides of the positive current collector 1*a*. The positive current collector 1*a* is left uncoated at both lengthwise ends to form exposed positive current collector portions 1*c* in a rectangular shape having its long sides along the lengthwise direction. The exposed current collector portions 1*c* are bent along 45° lines C from a lengthwise direction so that their side edges protrude beyond the widthwise edge of the positive current collector 1*a* by a predetermined distance. These portions protruding beyond the widthwise edge will serve as welding pieces 1*d* of the positive electrode.

More specifically, the positive electrode active material 1*b* comprises $LiMn_2O_4$, acetylene black (serving as a conductive agent), and polyvinylidene fluoride (serving as a binder) mixed at a weight ratio of 92:3:5, and kneaded into a paste, using N-methyl-pyrrolidone (NMP), a solvent for polyvinylidene fluoride. $LiMn_2O_4$ is a mixture of electrolytic manganese dioxide ($MnO_2$) and lithium carbonate ($Li_2CO_3$) at a ratio of 1:2, which has been baked at 800° C. for 20 hours. The paste of the positive electrode active material 1*b* is deposited on both sides of the positive current collector 1*a*, which is a 15 μm thick Al foil, leaving the rectangular exposed positive current collector portions 1*c* at both lengthwise ends, and dried. The total thickness of the positive electrode active material layers on both sides after the paste has been dried is 280 μm, which is reduced to 200 μm by compression molding.

Figure 2B:
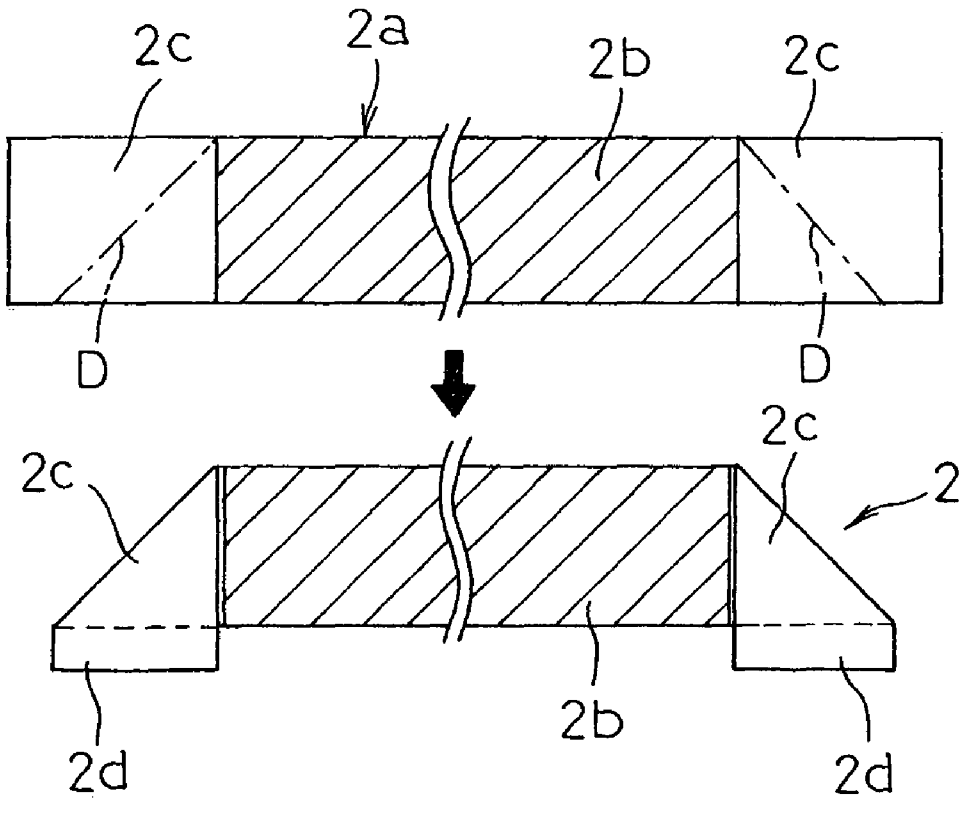

The negative electrode 2 is composed of a negative current collector 2*a* in the form of a strip having a predetermined length and a width, as shown in FIG. 2B, and a negative electrode active material 2*b* deposited on both sides of the negative current collector 2*a*. The negative current collector 2*a* is left uncoated at both lengthwise ends to form exposed negative current collector portions 2*c* in a rectangular shape having its long sides along the lengthwise direction. The exposed negative current collector portions 2*c* are bent along 45° lines D from a lengthwise direction in a direction opposite from that of the positive electrode 1 so that their side edges protrude beyond the widthwise edge of the negative current collector 2*a* by a predetermined distance. These portions protruding beyond the widthwise edge will serve as welding pieces 2*d* of the negative electrode.

More specifically, the negative electrode active material 2*b* is composed of artificial graphite and a styrene butadiene rubber (SBR) binder mixed at a weight ratio of 97:3 and kneaded into a paste, using an aqueous dispersion, which is the form of the used SBR. The above mixture ratio is based on solid components. The paste of the negative electrode active material 2*b* is deposited on both sides of the negative current collector 2*a*, which is a 14 μm thick Cu foil, leaving the rectangular current collector portions 2*c* at both lengthwise ends. After the negative electrode is dried, it is compressed so that the thickness is 170 μm.

Figure 3:
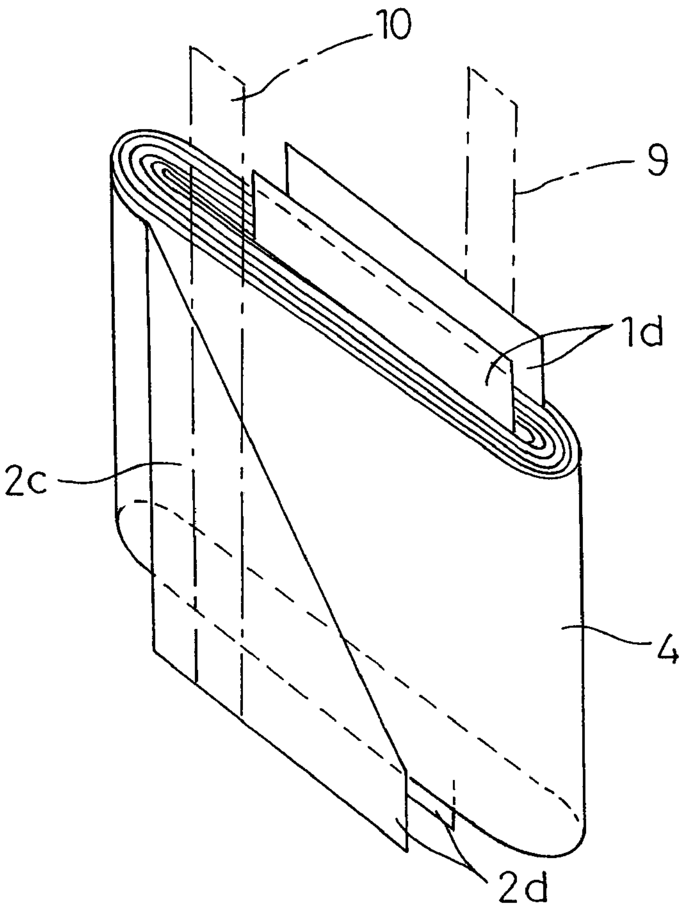
FIG. 3 is a perspective view showing the configuration of an electrode assembly using the electrodes shown above.
Figure 4:
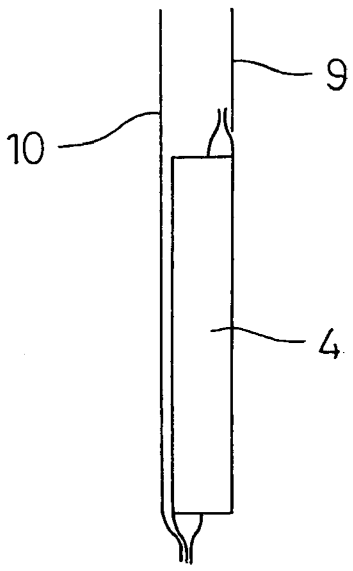
FIG. 4 is a side view for explaining how leads are connected to the electrode assembly of the above.
Figure 12:
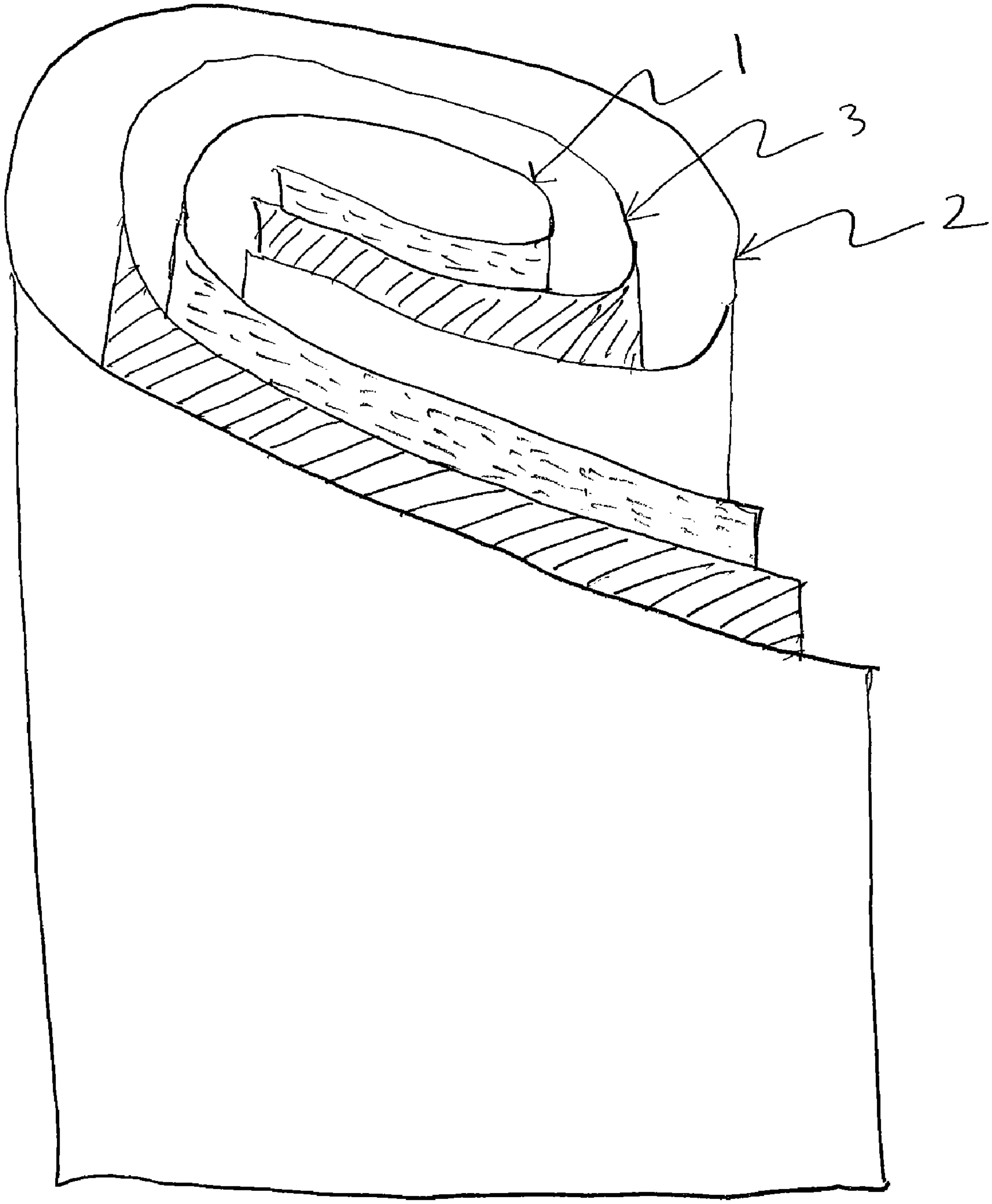
FIG. 12 illustrates the configuration of a positive electrode, a negative electrode and a separator.

The positive electrode 1 and the negative electrode 2 are superposed upon one another with a microporous polyethylene film separator 3 interposed therebetween and wound around into a spiral shape having an ellipsoidal cross-section as shown in FIG. 3 and FIG. 12. After the electrodes have been wound, as illustrated, the exposed positive current collector portions 1*c* at both ends of the positive electrode 1 and the exposed negative current collector portions 2*c* at both ends of the negative electrode 2 are located in a linear portion of the ellipsoidal shape. The two welding pieces 1*d* of the positive electrode 1 protrude from one end of the electrode assembly 4, and the two welding pieces 2*d* of the negative electrode 2 protrude from the other end. Thus, the two positive welding pieces 1*d* are pressed from both sides and welded with a positive electrode lead 9, and likewise the two negative welding pieces 2*d* are pressed from both sides and welded with a negative electrode lead 10, as shown in FIG. 4. The negative electrode lead 10 extends in the same direction as the positive electrode lead 9 because it is welded to the sealing plate 14 as shown in FIG. 1.

Referring back to FIG. 1, the electrode assembly 4 configured as above is inserted in the battery case 12, and the positive electrode lead 9 is welded to the external positive connection terminal 21, which is attached to the sealing plate 14 with an insulating member 15. The negative electrode lead 10 is welded to the sealing plate 14. The sealing plate 14 is fitted into the opening of the battery case 12 and welded along its periphery to the battery case 12 to close the case. A predetermined amount of an electrolyte is injected into the closed battery case 12 through an inlet 18. After a process of impregnating the electrode assembly 4 with the electrolyte, a sealing plug 19 is welded to the inlet 18 to hermetically seal the battery case 12. Thus the lithium ion rechargeable battery is complete. The external positive connection terminal 21 serves as the positive electrode, and the sealing plate 14 serves as the negative electrode connection terminal. The electrolyte is a solvent mixture of ethylene carbonate (EC) and diethyl carbonate (DEC) in a volume ratio of 1:1 with 1 mol/dm$^3$ of lithium hexafluorophosphate ($LiPF_6$) dissolved therein.

With the above-described first embodiment of the electrode structure, because of the rectangular exposed current collector portions 1c and 2c where the current collectors are exposed at both ends of the electrodes 1 and 2 with their long sides along the lengthwise direction, there is a problem that the electrodes 1 and 2 have relatively large areas that do not contribute to power generation. A second embodiment of the electrode structure described below is designed to reduce the areas that do not contribute to power generation.

FIG. 5A and FIG. 5B show the second embodiment of the positive electrode 1 and the negative electrode 2. As shown in FIG. 5A, the positive electrode 1 is composed of a positive current collector 1a in the form of a strip having a predetermined length and a width, and a positive electrode active material 1b deposited on both sides of the positive current collector 1a. The positive current collector 1a is left uncoated at both lengthwise ends. The exposed positive current collector portions 1c at both ends are split into two parts along a cut line E; a welding piece portion 1e having a predetermined ratio of long and short sides, and a remaining portion 1f. The welding piece portions 1e are bent along 45° lines C from a lengthwise direction so that their side edges protrude beyond the widthwise edge of the positive current collector 1a by a predetermined distance. These portions protruding beyond the widthwise edge will serve as the welding pieces 1d of the positive electrode.

The negative electrode 2, as shown in FIG. 5B, is composed of a negative current collector 2a in the form of a strip having a predetermined length and a width, and a negative electrode active material 2b deposited on both sides of the negative current collector 2a. The negative current collector 2a is left uncoated at both lengthwise ends. The exposed negative current collector portions 2c at both ends are split into two parts along a cut line F; a welding piece portion 2e having a predetermined ratio of long and short sides, and a remaining portion 2f. The welding piece portions 2e are bent along 45° lines D from a lengthwise direction so that their side edges protrude beyond the widthwise edge of the negative current collector 2a by a predetermined distance. These portions protruding beyond the widthwise edge will serve as the welding pieces 2d of the negative electrode.

Figure 6:
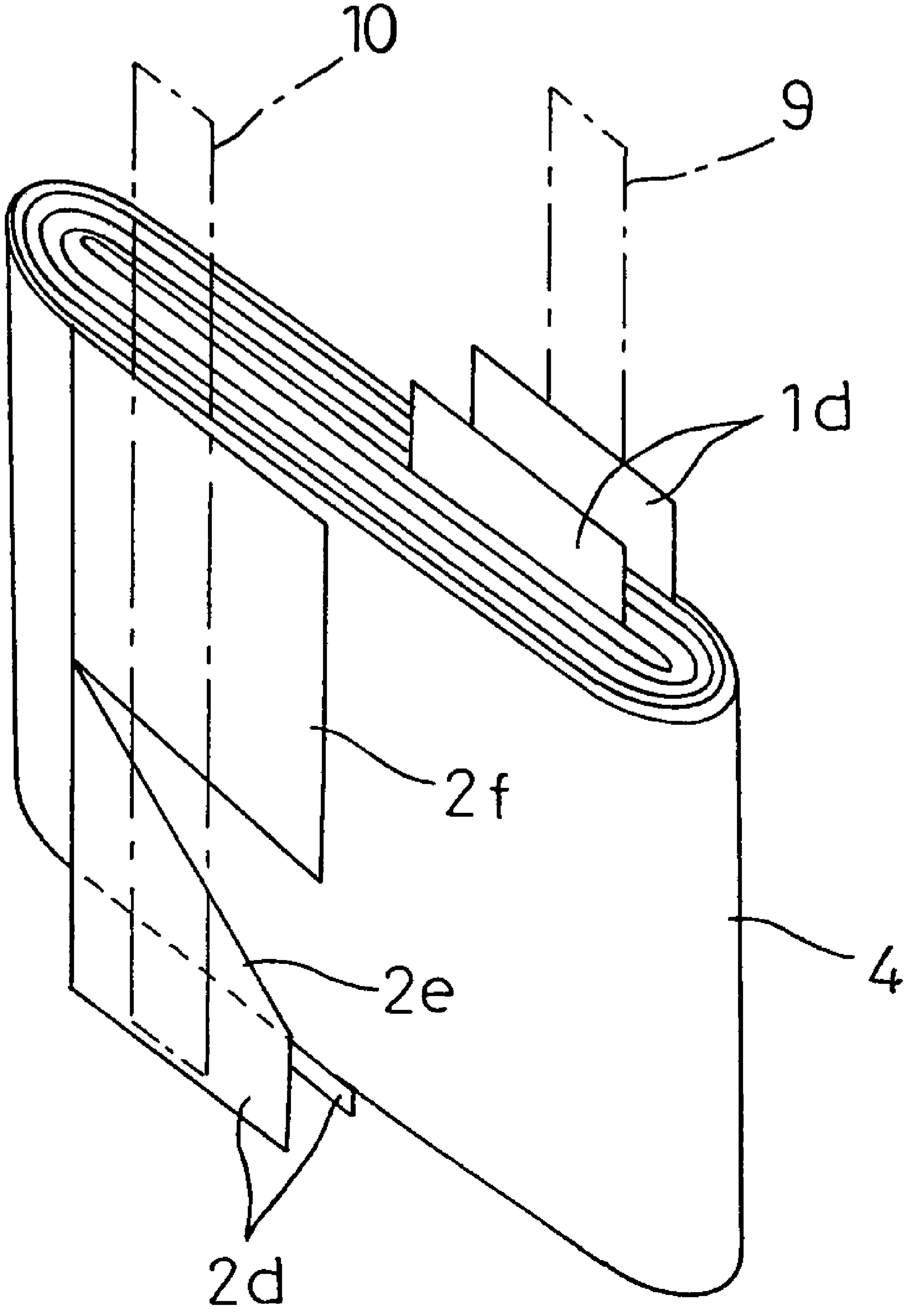
FIG. 6 is a perspective view showing the configuration of an electrode assembly using the electrodes of the above.

The positive electrode 1 and the negative electrode 2 are superposed upon one another with a microporous polyethylene film separator 3 interposed therebetween and wound around into a spiral shape having an ellipsoidal cross section as shown in FIG. 6 and FIG. 12. After the electrodes have been wound around, as shown, the exposed positive current collector portion 1c at both ends of the positive electrode 1 and the exposed negative current collector portion 2c at both ends of the negative electrode 2 are located in a linear portion of the ellipsoidal shape. The two welding pieces 1d of the positive electrode 1 protrude from one end of the electrode assembly 4, and the two welding pieces 2d of the negative electrode 2 protrude from the other end. Thus, as with the first embodiment, the two positive welding pieces 1d are pressed from both sides and welded with a positive electrode lead 9, and likewise the two negative welding pieces 2d are pressed from both sides and welded with a negative electrode lead 10. The electrode assembly 4 is encased in the battery case 12 and assembled into a lithium ion rechargeable battery as described in the first embodiment.

With the first and second embodiments of the electrode structure, because the positive and negative electrodes 1 and 2 are connected to the positive and negative leads 9 and 10 at both ends respectively, the current paths from a given position of the electrodes to the respective leads are shorter than in the conventional structure in which leads are connected to the electrodes only on one side. The battery internal resistance is accordingly lowered, whereby energy loss and a temperature rise during high-rate discharge are suppressed. The connection design in which the electrodes are connected to the leads at both ends is obviously not limited to the above-described first and second embodiments. Third and fourth embodiments described below of other electrode structures are also possible.

Figure 7A:
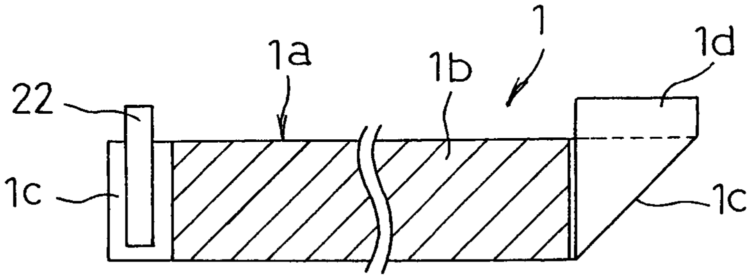
FIG. 7A and FIG. 7B are plan views showing the configuration of a positive electrode and a negative electrode, respectively, according to a third embodiment.
Figure 7B:
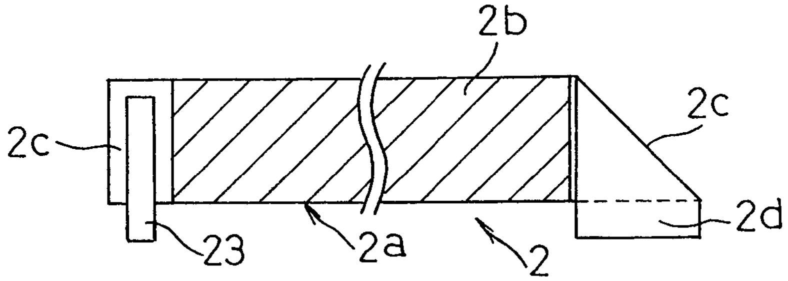

FIG. 7A and FIG. 7B show the third embodiment of the positive electrode 1 and the negative electrode 2. As shown in FIG. 7A, the positive electrode 1 is composed of a positive current collector 1a in the form of a strip having a predetermined length and a width, and a positive electrode active material 1b deposited on both sides of the positive current collector 1a. The positive current collector 1a is left uncoated at both lengthwise ends. The exposed positive current collector portion 1c on one side is bent at 45° so that a positive welding piece 1d protrudes a certain distance beyond the widthwise edge of the positive current collector 1a, as with the first embodiment. To the exposed positive current collector portion 1c on the other side is welded a welding lead 22 such that its one end protrudes a certain distance beyond the widthwise edge of the positive current collector 1a.

The negative electrode 2, as shown in FIG. 7B, is composed of a negative current collector 2a in the form of a strip having a predetermined length and a width, and a negative electrode active material 2b deposited on both sides of the negative current collector 2a. The negative current collector 2a is left uncoated at both lengthwise ends. The exposed negative current collector portion 2c on one side is bent at 45° so that a negative welding piece 2d protrudes a certain distance beyond the widthwise edge of the negative current collector 2a, as with the first embodiment. To the exposed negative current collector portion 2c on the other side is welded a welding lead 23 such that its one end protrudes a certain distance beyond the widthwise edge of the negative current collector 2a.

Figure 8A:
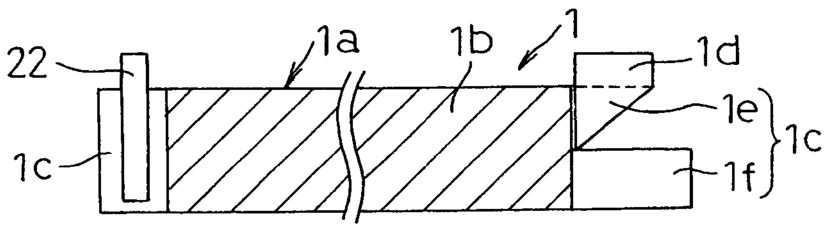
FIG. 8A and FIG. 8B are plan views showing the configuration of a positive electrode and a negative electrode, respectively, according to a fourth embodiment.
Figure 8B:
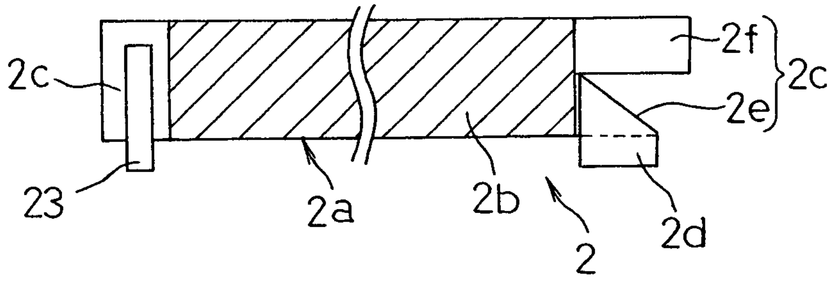

FIG. 8A and FIG. 8B show the fourth embodiment of the positive electrode 1 and the negative electrode 2. As shown in FIG. 8A, the positive electrode 1 is composed of a positive current collector 1a in the form of a strip having a predetermined length and a width, and a positive electrode active material 1b deposited on both sides of the positive current collector 1a. The positive current collector 1a is left uncoated at both lengthwise ends. The exposed positive current collector portion 1c on one side is split into two parts, a welding piece portion 1e and a remaining portion 1f, as with the second embodiment. The welding piece portion 1e is bent such that a positive welding piece 1d protrudes a certain distance beyond the widthwise edge of the positive current collector 1a. To the exposed positive current collector portion 1c on the other side is welded a welding lead 22 such that its one end protrudes a certain distance beyond the widthwise edge of the positive current collector 1a.

The negative electrode 2, as shown in FIG. 8B, is composed of a negative current collector 2a in the form of a strip having a predetermined length and a width, and a negative electrode active material 2b deposited on both sides of the negative current collector 2a. The negative current collector 2a is left uncoated at both lengthwise ends. The exposed negative current collector portion 2c on one side is split into two parts, a welding piece portion 2*e* and a remaining portion 2*f*, as with the second embodiment. The welding piece portion 2*e* is bent such that a negative welding piece 2*d* protrudes a certain distance beyond the widthwise edge of the negative current collector 2*a*. To the exposed negative current collector portion 2*c* on the other side is welded a welding lead 23 such that its one end protrudes a certain distance beyond the widthwise edge of the negative current collector 2*a*.

The third and fourth embodiments of the positive and negative electrodes 1 and 2 are superposed upon one another with a separator 3 interposed therebetween and wound around into a shape having an ellipsoidal cross section. The welding piece 1*d* and the welding lead 22 of the positive electrode 1 are welded together with the positive lead 9, and the welding piece 2*d* and the welding lead 23 of the negative electrode 2 are welded together with the negative lead 10. The electrode assembly 4 is then assembled into a lithium ion rechargeable battery as described in the first embodiment.

Figure 9:
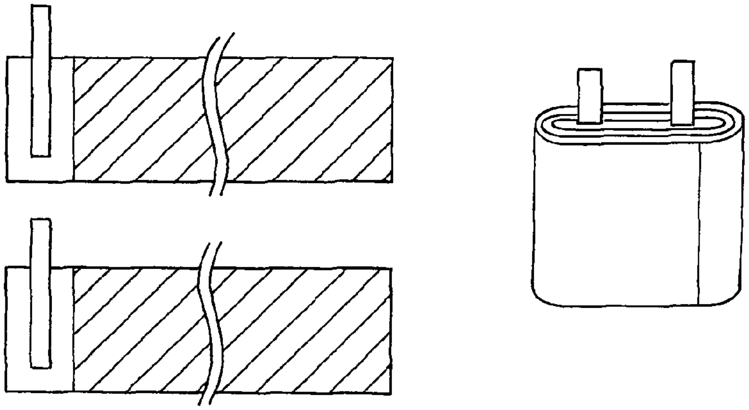
FIG. 9 is a plan view showing the configuration of a conventional electrode structure.
Figure 10:
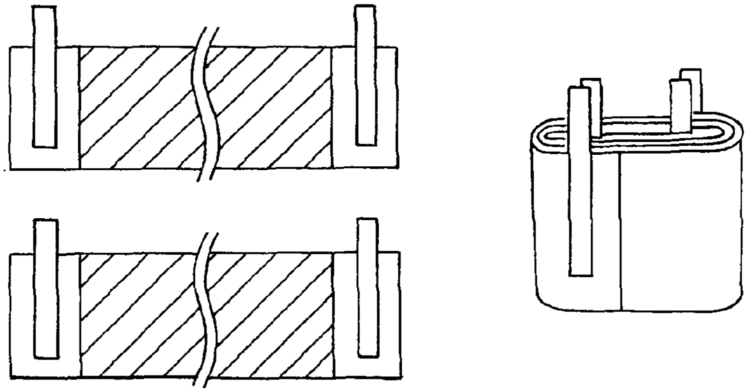
FIG. 10 is a plan view showing the configuration of another conventional electrode structure.
Figure 11:
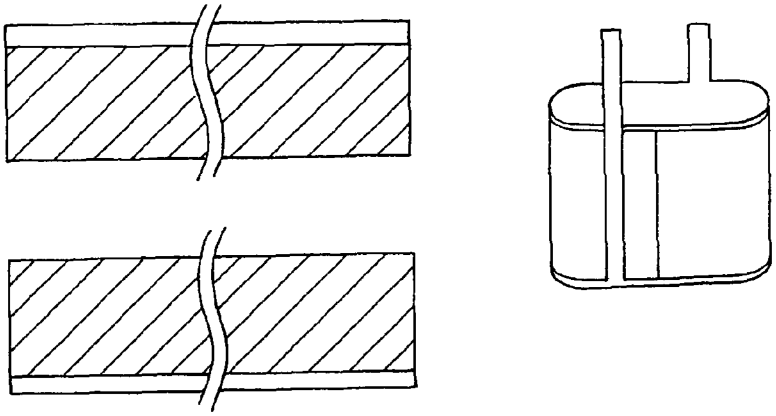
FIG. 11 is a plan view showing the configuration of yet another conventional electrode structure.

To prove the effect of the above-described first through fourth embodiments of the electrode structure, prismatic lithium ion rechargeable batteries with a design capacity of 3000 mAh were fabricated using the electrode assemblies of the invention and conventional electrode assemblies, and these batteries were compared and examined. Examples 1 to 4 are electrode assemblies having the first to fourth embodiments of the electrode structure of the invention, respectively. Comparative example 1 is a battery using an electrode assembly of a conventional structure, wherein each of positive and negative leads extends from an exposed current collector portion at one lengthwise end of each of the positive and negative electrodes, as shown in FIG. 9. Comparative example 2 is a battery using an electrode assembly wherein positive and negative leads extend from exposed current collector portions at both lengthwise ends of the electrodes and are welded together, as shown in FIG. 10. Comparative example 3 is a battery using an electrode assembly wherein the current collectors of the electrodes are exposed along their widthwise edges, and current collector plates are welded to the exposed current collector portions at both ends of the wound positive and negative electrodes for connection with leads, as shown in FIG. 11. A hundred pieces of electrode assemblies were prepared for each type, which were tested for welding faults and insulation faults. After the tests, internal resistance was measured with respect to twenty-five assemblies of each type that have passed the tests.

<Welding Fault Test>

The condition of the leads joined to the electrode assemblies at predetermined positions by resistance welding was inspected, and if there was any portion that was not connected normally, it was considered as a welding fault. The test results are shown in Table 1.

<Insulation Fault Test>

With respect to the electrode assemblies that have passed the welding fault test, an insulation resistance tester was connected to the leads of the positive and negative electrodes to make direct current resistance measurements. An electrode assembly whose resistance readings were less than 1MΩ was considered as defective. The test results are shown in Table 1.

TABLE 1

| | No. of Welding Fault | No. of Insulation Fault |
|---|---|---|
| Example 1 | 0/100 | 0/100 |
| Example 2 | 0/100 | 0/100 |
| Example 3 | 0/100 | 0/100 |
| Comparative Example 1 | 0/100 | 0/100 |
| Comparative Example 2 | 43/100 | 0/57 |
| Comparative Example 3 | 0/100 | 20/100 |

No welding faults were detected from the electrode assemblies of the examples 1 to 4 and the comparative examples 1 and 3. With the design of the comparative example 2, however, there tend to be a large variation in the positions of the pair of leads attached to both ends of the electrodes when the electrodes are wound, and when the leads are not appropriately positioned, they cannot be welded to the positive electrode terminal or the sealing plate. This result shows that the electrode structure of the comparative example 2 is not suitable for the battery design with flatly wound electrodes, because of the complexity in welding the pairs of the leads together.

As for the insulation properties, while no insulation faults were detected from the electrode assemblies of the examples 1 to 4 and the comparative examples 1 and 2, a large number of defective electrode assemblies were found with the design of the comparative example 3. A closer observation of the assemblies in which an insulation fault was found revealed that the heat in the process of welding current collector plates to the widthwise edges of the positive and negative electrodes had caused damage on the separator; they were melted, and the positive and negative electrodes were in contact with each other. This result shows that current collector design using the entire widthwise edges of the electrodes is not suitable for batteries that use thin collector plates such as lithium ion rechargeable batteries.

<Internal Resistance Measurement>

Batteries were fabricated using the electrode assemblies that had passed the insulation fault test, and these batteries were charged at a constant current of 1500 mA up to 4.2V, then discharged at 1500 mA to 3.0V. The charge/discharge cycle was repeated three times to activate the batteries, after which internal resistance was measured with an AC measurement frequency of 1 kHz. The results are shown in Table 2.

TABLE 2

| Battery No. | Example 1 Internal Resistance (mΩ) | Example 2 Internal Resistance (mΩ) | Example 3 Internal Resistance (mΩ) | Example 4 Internal Resistance (mΩ) | Comparative Example 1 Internal Resistance (mΩ) | Comparative Example 2 Internal Resistance (mΩ) | Comparative Example 3 Internal Resistance (mΩ) |
|---|---|---|---|---|---|---|---|
| 1 | 9.13 | 9 | 9.13 | 9.21 | 15.1 | 9.21 | 4.42 |
| 2 | 9 | 9.02 | 9 | 9.05 | 15.9 | 9.01 | 4.32 |
| 3 | 9 | 9.12 | 9.01 | 9.01 | 15.7 | 9.01 | 4.4 |

TABLE 2-continued

| Battery No. | Example 1 Internal Resistance (mΩ) | Example 2 Internal Resistance (mΩ) | Example 3 Internal Resistance (mΩ) | Example 4 Internal Resistance (mΩ) | Comparative Example 1 Internal Resistance (mΩ) | Comparative Example 2 Internal Resistance (mΩ) | Comparative Example 3 Internal Resistance (mΩ) |
|---|---|---|---|---|---|---|---|
| 4 | 9 | 9.1 | 9.06 | 9.06 | 15.8 | 9 | 4.45 |
| 5 | 9.17 | 9.19 | 9.04 | 9.21 | 15.5 | 9.13 | 4.45 |
| 6 | 9.1 | 9.14 | 9.11 | 9.05 | 15.5 | 9.16 | 4.4 |
| 7 | 9.06 | 9.05 | 9.12 | 9.12 | 15.4 | 9.13 | 4.35 |
| 8 | 9.06 | 9.21 | 9.08 | 9.01 | 15.3 | 9.06 | 4.41 |
| 9 | 9.06 | 9.01 | 9.08 | 9.01 | 15.1 | 9.07 | 4.42 |
| 10 | 9.06 | 9.01 | 9.06 | 9 | 15.2 | 9.12 | 4.42 |
| 11 | 9.21 | 9 | 9.03 | 9.13 | 15.5 | 9.11 | 4.43 |
| 12 | 9.05 | 9.13 | 9.11 | 9.16 | 15.5 | 9.05 | 4.4 |
| 13 | 9.06 | 9.16 | 9.02 | 9.02 | 14.9 | 9.08 | 4.51 |
| 14 | 9.05 | 9.13 | 9.02 | 9.16 | 14.7 | 9.08 | 4.5 |
| 15 | 9.04 | 9 | 9.12 | 9.13 | 14.6 | 9.06 | 4.55 |
| 16 | 9.05 | 9 | 9.1 | 9 | 14.8 | 9.03 | 4.31 |
| 17 | 9.06 | 9 | 9.19 | 9.19 | 15 | 9.11 | 4.32 |
| 18 | 9.07 | 9.17 | 9.14 | 9.14 | 15.5 | 9.02 | 4.37 |
| 19 | 9.12 | 9.1 | 9.05 | 9.05 | 15.7 | 9.02 | 4.41 |
| 20 | 9.11 | 9.06 | 9.21 | 9.03 | 15.2 | 9.12 | 4.41 |
| 21 | 9.05 | 9.06 | 9.01 | 9.06 | 15.9 | 9 | 4.43 |
| 22 | 9.05 | 9.06 | 9.01 | 9.07 | 15.7 | 9.02 | 4.5 |
| 23 | 9.06 | 9.06 | 9 | 9.12 | 15.2 | 9.12 | 4.49 |
| 24 | 9.07 | 9.21 | 9.13 | 9.11 | 15.3 | 9.1 | 4.47 |
| 25 | 9.08 | 9.05 | 9.16 | 9.16 | 15.4 | 9.19 | 4.45 |

As seen from Table 2, while the internal resistance of the batteries of the examples 1 to 4 and the comparative examples 1 and 2 was as small as about 4.5 to 9.0 mΩ on average, the internal resistance of the batteries of the comparative example 1 was as large as about 15.5 mΩ on average. This large internal resistance is attributable to poor electron conductivity because of the long distance from one lengthwise end of the electrode where the lead is joined to the other end. The test results show that the internal resistance could be reduced by connecting leads at both lengthwise ends of the electrodes, and batteries with such a design are mass-producible.

While the current collector design, which is the characteristic feature of the invention, is applied to lithium ion rechargeable batteries in the above-described embodiments, this design may equally be applied to other types of batteries having wound electrodes such as a nickel metal hydride battery, or an electric double layer capacitor.

The above-described electrode structure of the present invention is applicable to production of low internal resistance, high output power electrochemical elements with a good yield. The present invention design is particularly suited to an electrochemical element used as a drive power source of a power tool or an electric vehicle, which require large current charge/discharge cycles.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. An electrochemical element comprising a case, an electrolyte, and an electrode assembly accommodated in the case with the electrolyte, the electrode assembly including a positive electrode having a current collector strip with a positive electrode active material deposited thereon, and a negative electrode having a current collector strip with a negative electrode active material deposited thereon, the positive and negative electrodes being wound around a separator interposed therebetween to form the electrode assembly, positive and negative leads respectively connected to portions of the positive and negative electrodes to serve as respective positive and negative external connection terminals, wherein the positive and negative electrodes include respective exposed current collector portions at both ends in a lengthwise direction where respective positive electrode active material and negative electrode active material have not been deposited;

the exposed current collector portions are bent from a lengthwise direction along a bending line of a predetermined angle, the bending direction of one electrode being opposite from that of the other electrode, such that edges of the exposed current collector portions in the lengthwise direction protrude beyond an edge of the electrodes in a width direction to form welding pieces;

the positive and negative electrodes with the separator interposed therebetween are wound to form the electrode assembly having an ellipsoidal cross-section, such that the welding pieces are located in a linear portion of the ellipsoidal shape; and a welding piece of the positive electrode protruding out from one end of the electrode assembly is pressed together in a shorter side direction of the ellipsoidal cross-section and is welded together with the positive lead to form a welding joint, and a welding piece of the negative electrode protruding out from the other end of the electrode assembly is pressed together in the shorter side direction of the ellipsoidal cross-section and is welded together with the negative lead to form a welding joint, wherein exposed current collector portions at the ends of the positive and negative electrodes are split in a widthwise direction such that split portions are approximate rectangles having a predetermined ratio of long and short sides to protrude from the edge of the electrode assembly by a predetermined distance.

2. An electrochemical element comprising a case, an electrolyte, and an electrode assembly accommodated in the case with the electrolyte, the electrode assembly including a positive electrode having a current collector strip with a positive electrode active material deposited thereon, and a negative electrode having a current collector strip with a negative electrode active material deposited thereon, the positive and negative electrodes being wound around a separator interposed therebetween to form the electrode assembly, positive and negative leads respectively connected to portions of the positive and negative electrodes to serve as respective positive and negative external connection terminals, wherein the positive and negative electrodes include respective exposed current collector portions at both ends in a lengthwise direction where respective positive electrode active material and negative electrode active material have not been deposited;

one of the exposed current collector portions is connected to a lead welding piece such that one end of the lead welding piece protrudes in a width direction towards a side opposite to the other corresponding electrode;

the other of the exposed current collector portions is bent from the lengthwise direction along a bending line of a predetermined angle, the bending direction of one electrode being opposite from that of the other electrode, such that both edges of the exposed current collector portion in the lengthwise direction protrude beyond edges of the electrode in the width direction to form welding pieces;

the positive and negative electrodes with the separator interposed therebetween are wound around to form the electrode assembly having an ellipsoidal cross-section, such that the lead welding piece and the welding pieces are located in a linear portion of the ellipsoidal shape; and the lead welding piece and the welding piece of the positive electrode protruding out from one end of the electrode assembly are pressed together in a shorter side direction of the ellipsoidal cross-section and are welded together with the positive lead to form a welding joint, and the lead welding piece and the welding piece of the negative electrode protruding out from the other end of the electrode assembly are pressed together in the shorter side direction of the ellipsoidal cross-section and are welded together with the negative lead to form a welding joint, wherein exposed current collector portions at the ends of the positive and negative electrodes are split in a widthwise direction such that split portions are approximate rectangles having a predetermined ratio of long and short sides to protrude from the edge of the electrode assembly by a predetermined distance.

3. The electrochemical element of claim 1, wherein exposed current collector portions at the ends of the positive and negative electrodes are formed in an approximate rectangular shape having a sufficient length so that they protrude a predetermined distance from the edges of the electrode assembly.

4. The electrochemical element of claim 2, wherein exposed current collector portions at the ends of the positive and negative electrodes are formed in an approximate rectangular shape having a sufficient length so that they protrude a predetermined distance from the edges of the electrode assembly.

5. An electrochemical element, comprising:

a positive electrode that includes an exposed current collector portion with a positive electrode active material deposited thereon;

a negative electrode that includes an exposed current collector portion with a negative electrode active material deposited thereon; and a separator interposed between the positive and negative electrodes and wound thereon to form an electrode assembly with an ellipsoidal cross-section, welding pieces being located in a linear portion of the ellipsoidal cross-section, wherein a welding piece of the positive electrode protrudes out from one end of the electrode assembly and is pressed together in a shorter side direction of the ellipsoidal cross-section and is welded together with the positive lead to form a first welding joint, while a welding piece of the negative electrode protrudes out from the other end of the electrode assembly and is pressed together in the shorter side direction of the ellipsoidal cross-section and is welded together with the negative lead to form a second welding joint, wherein exposed current collector portions at ends of the positive and negative electrodes are split in a widthwise direction, wherein each exposed current collector portion is bent in a lengthwise direction along a bending line of a predetermined angle, the bending direction of one electrode being opposite from that of the other electrode, such that exposed current collector edge portions in the lengthwise direction protrude beyond an edge of the electrodes in a width direction to form welding pieces.

6. An electrochemical element, comprising:

a positive electrode that includes an exposed current collector portion with a positive electrode active material deposited thereon;

a negative electrode that includes an exposed current collector portion with a negative electrode active material deposited thereon; and a separator interposed between the positive and negative electrodes and wound thereon to form an electrode assembly with an ellipsoidal cross-section, welding pieces being located in a linear portion of the ellipsoidal cross-section, wherein a welding piece of the positive electrode protrudes out from one end of the electrode assembly and is pressed together in a shorter side direction of the ellipsoidal cross-section and is welded together with the positive lead to form a first welding joint, while a welding piece of the negative electrode protrudes out from the other end of the electrode assembly and is pressed together in the shorter side direction of the ellipsoidal cross-section and is welded together with the negative lead to form a second welding joint, wherein exposed current collector portions at ends of the positive and negative electrodes are split in a widthwise direction, and wherein one exposed current collector portion is connected to a lead welding piece having one end that protrudes in a width direction towards a side opposite to an other corresponding electrode, and the remaining exposed current collector portion is bent from a lengthwise direction along a bending line of a predetermined angle.

7. The electrochemical element of claim 6, wherein a bending direction of one electrode is opposite from that of the other electrode, such that both edges of the exposed current collector portion in the lengthwise direction protrude beyond edges of the electrode in the width direction to form the welding pieces.

8. The electrochemical element of claim 5, wherein the positive and negative electrodes include respective exposed current collector portions at and end in a lengthwise direction.

9. The electrochemical element of claim 5, wherein exposed current collector portions at ends of the positive and negative electrodes are approximately rectangular in shape and protrude a predetermined distance from edges of the electrode assembly.

10. The electrochemical element of claim 5, wherein split portions formed by the positive and negative electrodes split in the widthwise direction have an approximate rectangular shape that protrude from an edge of the electrode assembly.

11. The electrochemical element of claim 10, wherein the split portions protrude from the edge of the electrode assembly by a predetermined distance.

* * * * *